United States Patent
Andersson et al.

(10) Patent No.: US 6,712,036 B1
(45) Date of Patent: Mar. 30, 2004

(54) METHOD OF CONTROLLING THE FUEL INJECTION IN AN INTERNAL COMBUSTION ENGINE

(75) Inventors: Arne Andersson, Molnlycke (SE); Anders Hoglund, Fjaras (SE); Jan Eismark, Gothenburg (SE); Bo Svensson, Hisings Backa (SE)

(73) Assignee: AB Volvo, Gothenburg (SE)

( * ) Notice: Subject to any disclaimer, the term of this patent is extended or adjusted under 35 U.S.C. 154(b) by 39 days.

(21) Appl. No.: 10/089,251
(22) PCT Filed: Sep. 29, 2000
(86) PCT No.: PCT/SE00/01889
§ 371 (c)(1),
(2), (4) Date: Aug. 6, 2002
(87) PCT Pub. No.: WO01/23717
PCT Pub. Date: Apr. 5, 2001

(30) Foreign Application Priority Data

Sep. 29, 1999 (SE) ............................................. 9903525

(51) Int. Cl.$^7$ .................................................. F02B 3/00
(52) U.S. Cl. ...................................... 123/299; 123/276
(58) Field of Search .............................. 123/299, 300, 123/305, 295, 511, 276; 701/104

(56) References Cited

U.S. PATENT DOCUMENTS

| | | | | |
|---|---|---|---|---|
| 4,284,043 A | * | 8/1981 | Happel | 123/299 |
| 4,530,337 A | * | 7/1985 | Laufer | 123/506 |
| 5,462,030 A | * | 10/1995 | Shinogle | 123/457 |
| 5,609,131 A | | 3/1997 | Gray, Jr. et al. | |
| 5,839,275 A | | 11/1998 | Hirota et al. | |
| 5,956,942 A | | 9/1999 | Sebastiano et al. | |
| 6,073,608 A | | 6/2000 | Krieger et al. | |
| 6,491,016 B1 | * | 12/2002 | Buratti | 123/299 |
| 6,526,939 B2 | * | 3/2003 | Reitz et al. | 123/299 |

FOREIGN PATENT DOCUMENTS

| | | |
|---|---|---|
| DE | 195 34 770 | 3/1996 |
| EP | 0 586 775 | 3/1994 |
| EP | 0 844 380 | 5/1998 |
| EP | 0 887 525 | 12/1998 |
| EP | 0 894 960 | 2/1999 |
| EP | 0 905 361 | 3/1999 |
| EP | 0 911 511 | 4/1999 |
| EP | 0 924 416 | 6/1999 |

* cited by examiner

*Primary Examiner*—Mahmoud Gimie
(74) *Attorney, Agent, or Firm*—Young & Thompson

(57) ABSTRACT

A method of controlling the fuel injection in an internal combustion engine (1) having a piston (3), which passes to and for in a cylinder (2) between an upper and a lower dead center, and an injection nozzle (4), which is disposed in the cylinder (2), the method including the steps whereby a primary injection of fuel is realized in the cylinder (2), which fuel is ignited and causes the piston (3) to be moved in the direction of the lower dead center in the cylinder (2), and whereby a post-injection of a fluid is realized in the cylinder (2). The injection pressure of the fluid in the post-injection is higher than the injection pressure of the fuel in the primary injection.

12 Claims, 4 Drawing Sheets

METHOD OF CONTROLLING THE FUEL INJECTION IN AN INTERNAL COMBUSTION ENGINE

BACKGROUND OF THE INVENTION

The present invention relates to a method of controlling the fuel injection in an internal combustion engine comprising a piston, which passes to and fro in a cylinder between an upper and a lower dead centre, and an injection nozzle, which is disposed in the cylinder. The method comprises the steps whereby a primary injection of fuel is realized in the cylinder, which fuel is ignited and causes the piston to be moved in the direction of the lower dead centre in the cylinder, and whereby a post-injection of a fluid is realized in the cylinder.

DESCRIPTION OF THE PRIOR ART

A combustion process in which the fuel is injected directly into the cylinder and is ignited by increased temperature and pressure in the cylinder is commonly referred to as the diesel process. When the fuel is injected and burns in the cylinder, a turbulent mixing takes place of combustion gases present in the cylinder with the burning fuel. The combustion of the fuel/gas mixture in the cylinder generates heat, which heat generation causes the gas in the cylinder to expand and thereby causes the piston to move within the cylinder. Depending on a large number of parameters, such as the injection pressure of the fuel, the quantity of exhaust gases recycled to the cylinder, the time of injection of the fuel and the turbulence and temperature prevailing in the cylinder, different efficiency values and engine emission values are obtained.

Conventional internal combustion engines which work according to the diesel process have relatively high values in terms of discharged emissions, such as soot particles. During the expansion, regions having an inadequate excess of air are found locally in the cylinder, resulting in incomplete combustion of the fuel injected into the cylinder. Emissions in the form of soot particles are thereby generated, which accompany the exhaust gases during the exhaust stroke.

It is previously known to reduce the formation of soot particles by injecting the fuel early in or in advance of the expansion stroke or working stroke, whilst at the same time seeking to delay ignition of the fuel, so that the fuel gets to be vaporized and is mixed prior to ignition with gases present in the cylinder. Methods therefore exist for reducing the content of emissions from a conventional engine. There are, however, limitations with these known methods, which in extreme cases make the engine inoperable.

When the piston, during the working stroke, is moved towards the lower dead centre, the pressure and temperature in the cylinder fall. During the expansion, the turbulence or the remixing of gases, fuel and formed soot particles has also been shown to be comparatively low in the cylinder, and especially in a peripheral region close to the cylinder wall. In overall terms, this leads to a reduction in the oxidation of formed soot particles during the expansion, which unoxidized soot particles accompany the exhaust gases of the internal combustion engine during the exhaust stroke.

BRIEF SUMMARY OF THE INVENTION

One object of the present invention is to control the fuel injection in an internal combustion engine such that the abovementioned drawbacks with the prior art are eliminated and such that the soot particle content in the exhaust gases of the internal combustion engine is as low as possible.

A further object of the invention is to increase the oxidation of soot particles formed in the cylinder in order thereby to reduce the number of soot particles in the exhaust gases of the internal combustion engine.

This is achieved by virtue of a method of the type stated in the introduction, in which the injection pressure of the fluid in the post-injection is higher than the injection pressure of the fuel in the primary injection.

As a result of the post-injection, fuel, gas and soot particles in regions in which a turbulent or agitating motion has ceased are made to recirculate and be mixed, which enables and accelerates the oxidation of soot particles. By controlling the post-injection such that the fluid is injected at a higher pressure than the injection pressure of the fuel in the primary injection, regions in which turbulence and remixing have ceased are more quickly reached, thereby creating vigorous remixing in the said regions.

BRIEF DESCRIPTION OF THE DRAWINGS

The invention will be described in greater detail below with reference to illustrative embodiments shown in the appended figures, in which.

DETAILED DESCRIPTION OF THE INVENTION

Figure 1:
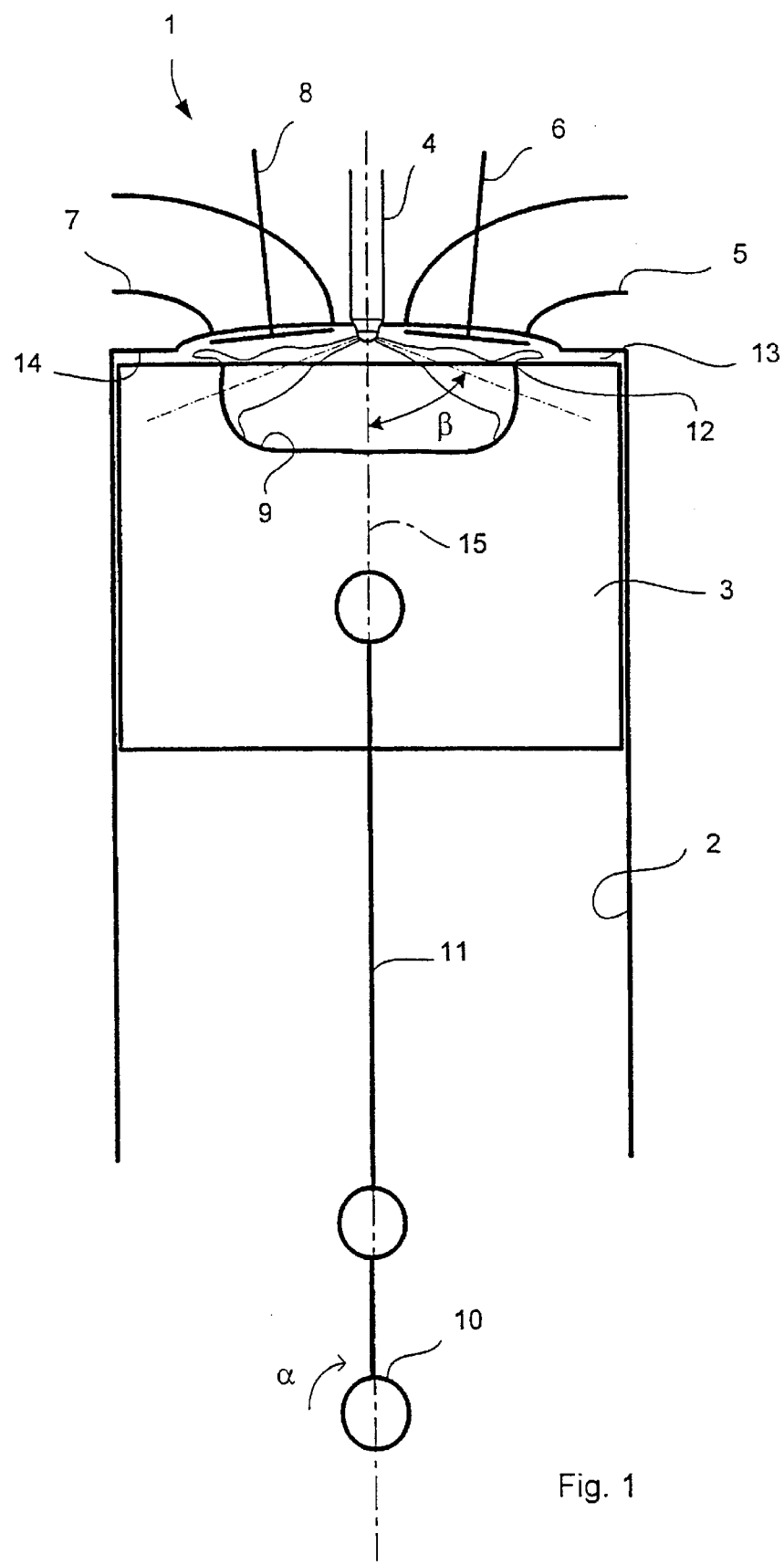
FIG. 1 shows a diagrammatic view of an internal combustion engine in which a primary injection of fuel is realized according to the invention.

FIG. 1 shows a diagrammatic view of an internal combustion engine 1 in which a primary injection of fuel is realized according to the invention. The engine 1 comprises a piston 3, which passes to and fro in a cylinder 2 between an upper and a lower dead centre, and an injection nozzle 4, which is disposed in the cylinder 2. An induction port 5 with an associated suction valve 6 extends to the cylinder 2 and an exhaust port 7 with an associated exhaust valve 8 extends from the cylinder 2. A recess 9 is configured in the top side of the piston 3, which recess 9 forms a combustion chamber. The piston 3 according to the illustrative embodiment shown in FIG. 1 is connected to a crankshaft 10 by a connecting rod 11. It is possible, however, to configure the engine 1 as a free-piston engine, thereby eliminating the connecting rod 11.

As can be seen from FIG. 1, the piston 3 is located at the upper dead centre when a primary fuel injection is realized in the cylinder 2. Preferably, the fuel is injected directly into the recess 9 formed in the piston 3. At the same time as the fuel is injected into the cylinder 2, a part of the fuel is mixed with gas sucked into the cylinder 2, consisting of air and any exhaust gases recycled to the cylinder 2, which exhaust gases have been compressed and hence heated during the compression. The part of the fuel which has been mixed with the gas will be ignited and will burn, owing to the high temperature in the cylinder 2.

If the part of the fuel which has been mixed with the gas present in the cylinder 2 burns with a deficit of oxygen, soot particles will be formed during the combustion. In this context, a lambda value of the fuel/gas mixture is defined. Another designation for the lambda value is the air excess coefficient, which is defined as the actual supplied quantity of air divided by the theoretical necessary quantity of air for complete combustion. If the lambda value is greater than one, the fuel/gas mixture is lean, and if the lambda value is less than one, the fuel/gas mixture is rich. Incomplete combustion of the fuel/gas mixture therefore occurs when this is rich, so that soot particles are formed. In order to obtain the minimum possible generation of soot particles, a mixture of fuel and gas with a lambda value equal to or greater than one is sought. In an internal combustion engine in which the fuel is injected directly into the cylinder and ignited by the heat generated during the compression, such as in a diesel engine, a diffusion combustion of the fuel often occurs, which means that the fuel, during the injection, principally burns in a formed stoichiometric border. In a region close to the stoichiometric border, in which the fuel/gas mixture is rich, soot particles are formed during the combustion.

During the primary injection of the fuel into the cylinder 2, a part-volume of the injected fuel comes to flow over a circumferential edge 12, which limits the recess 9 formed in the top part of the piston 3. Owing to the geometry of the cylinder 2 and piston 3, this part-volume of the fuel, during the motion of the piston 3 in the direction down towards the lower dead centre position, will contain comparatively little kinetic energy, so that the remixing between gas present in the cylinder 2 and fuel will be small, thereby increasing the soot particle formation. During the expansion, the turbulence or the remixing of fuel, gasses and formed soot particles is comparatively low in the cylinder 2 and especially in a peripheral region 13 in the cylinder 2. The reduced remixing of oxygen and soot particles leads to reduced oxidation of the formed soot particles.

In order to increase the turbulence and remixing of oxygen and soot particles in the cylinder 2, according to the invention a post-injection of a fluid is realized when the piston 3 has been moved in the direction of the lower dead centre in the cylinder 2. The injection pressure of the fluid in the post-injection is higher than the injection pressure of the fuel in the primary injection. According to one illustrative embodiment of the invention, the fuel is injected during the primary injection at a pressure of 200–1500 bar, preferably 300–1000 bar, and the fluid is injected during the post-injection at the pressure 1500–3000 bar, preferably 1600–2000 bar. The said differences in injection pressure can be produced by the use of, for example, an injection device of the unit injector type. The higher pressure during the post-injection has the effect that fuel, gas and soot particles in regions in which a turbulent or agitating motion has ceased or significantly diminished are made once again to circulate and be mixed or to circulate and be mixed in greater measure, which enables and/or accelerates the oxidation of remaining soot particles.

Figure 2:
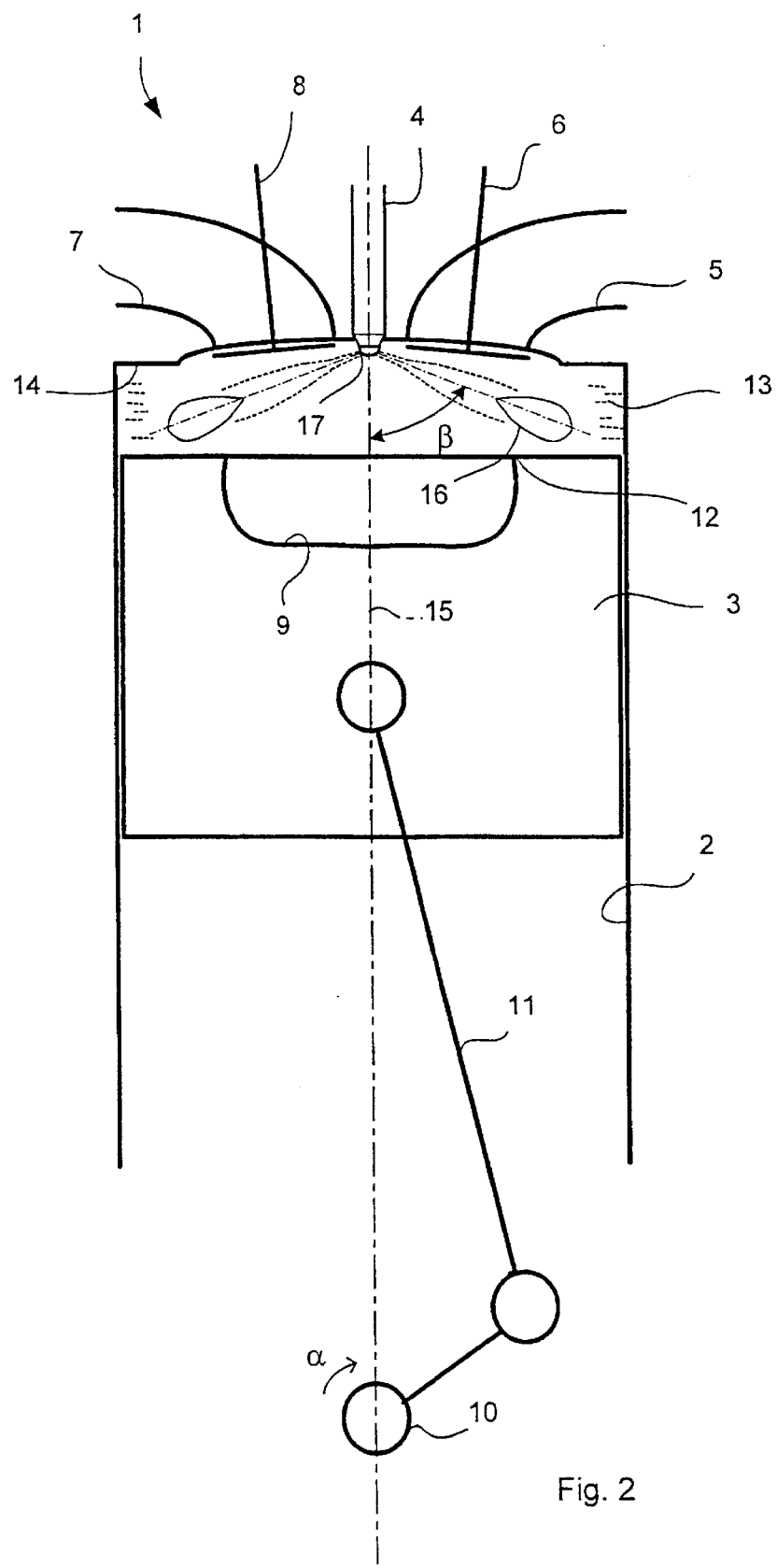
FIG. 2 shows a diagrammatic view of an internal combustion engine according to FIG. 1, in which a post-injection of fuel is realized according to the invention.

It has proved advantageous for the post-injection to be realized at a time corresponding to the angle of rotation α of the crankshaft 10 of the engine 1 within the range 20°–60°, preferably within the range 27°–50°, after the upper dead centre with respect to the working stroke of the engine. Especially good results in terms of the oxidation of soot particles are obtained if the post-injection is realized when the angle of rotation α of the crankshaft 10 is approximately 40°, preferably approximately 37°, after the upper dead centre with respect to the working stroke of the engine. The method according to the invention is applicable to two-stroke engines and four-stroke engines and to engines which work with still more strokes. If the engine is a free-piston engine, the abovementioned angles can be related to a distance by which the piston is moved in the cylinder or to a corresponding certain point in time. FIG. 2 illustrates how the post-injection of fuel is realized according to the invention.

In the post-injection, the piston 3 has moved so far that the fluid which is injected through the injection nozzle 4 hits the peripheral region 13 above the piston 3. Kinetic energy from the post-injected fluid thus comes to be supplied to the cylinder 2 in the region between the top part of the piston 3 and the upper end 14 of the cylinder 2. It is not only the peripheral region 13 which is acted upon by the fuel injected during the post-injection. A large region above the whole of the piston 3 and its recess 9 will be supplied with kinetic energy from the fuel injected during the post-injection. Since the pressure in the cylinder 2 has fallen during the expansion and the fluid is supplied under high pressure, the fluid ends up penetrating a substantial volume of the region between the top part of the piston 3 and the upper end 14 of the cylinder 2. Preferably, the fluid is injected during the post-injection with the shortest possible duration. In the illustrative embodiment shown in FIG. 3, the duration corresponds to the angle of rotation α of approximately 2° of the crankshaft 10 of the engine 1. The effect of this is that the fluid is injected as a pressure shock into the cylinder 2 for a very short time span. An elevated injection pressure during the post-injection enables a short duration, since a predetermined volume of fuel has to be supplied during the post-injection. The short duration and the high pressure result in a large impulse and vigorous remixing. The fluid injected during the post-injection is preferably constituted by fuel, such as diesel oil or a mixture of fuel with, for example, water, but can also be constituted by air or another gas. By arranging for the fluid injected during the post-injection to be constituted by fuel, which is ignited during the injection, the temperature in the cylinder is increased, thereby promoting the oxidation of the soot particles. By configuring the piston 3, the recess 9 and the cylinder in a suitable manner and by forming the holes 17 in the injection nozzle 4, through which holes the fuel is injected, the regions with rich fuel/gas mixture which appear after the primary injection can be controlled such that these regions will be acted upon by the fuel injected during the post-injection. Also the fuel pressure at the start of the primary injection and the starting time for the primary injection are parameters which affect the positioning of the said regions in the cylinder at the time of the post-injection.

As can be seen from FIG. 2, the fluid is injected into the cylinder 2 at an umbrella angle β in relation to the centreline 15 of the cylinder 2 such that the fluid, during the post-injection, is prevented from hitting the recess 9 of the piston 3. By umbrella angle β is meant the angle which is formed between the fuel jet 16 which is sprayed out of the injection nozzle 4 and the centreline 15 of the cylinder 2. The umbrella angle β must also be chosen such that the fuel, during the primary injection, is mainly injected into the recess 9 of the piston 3, so as thereby to prevent fuel from flowing over the edge 12 of the recess and reaching the peripheral region 13 in the cylinder 2. In FIGS. 1 and 2, only two fuel jets 16 are shown, but in practice a plurality of holes 17 are arranged in the injection nozzle 4 so that an umbrella is formed by the fuel jets 16 injected through the injection nozzle 4. In a further embodiment, the fuel is injected into the cylinder 2 at an umbrella angle β in relation to the centreline 15 of the cylinder 2 such that the fluid, during the post-injection, is prevented from hitting the piston 3.

Figure 3:
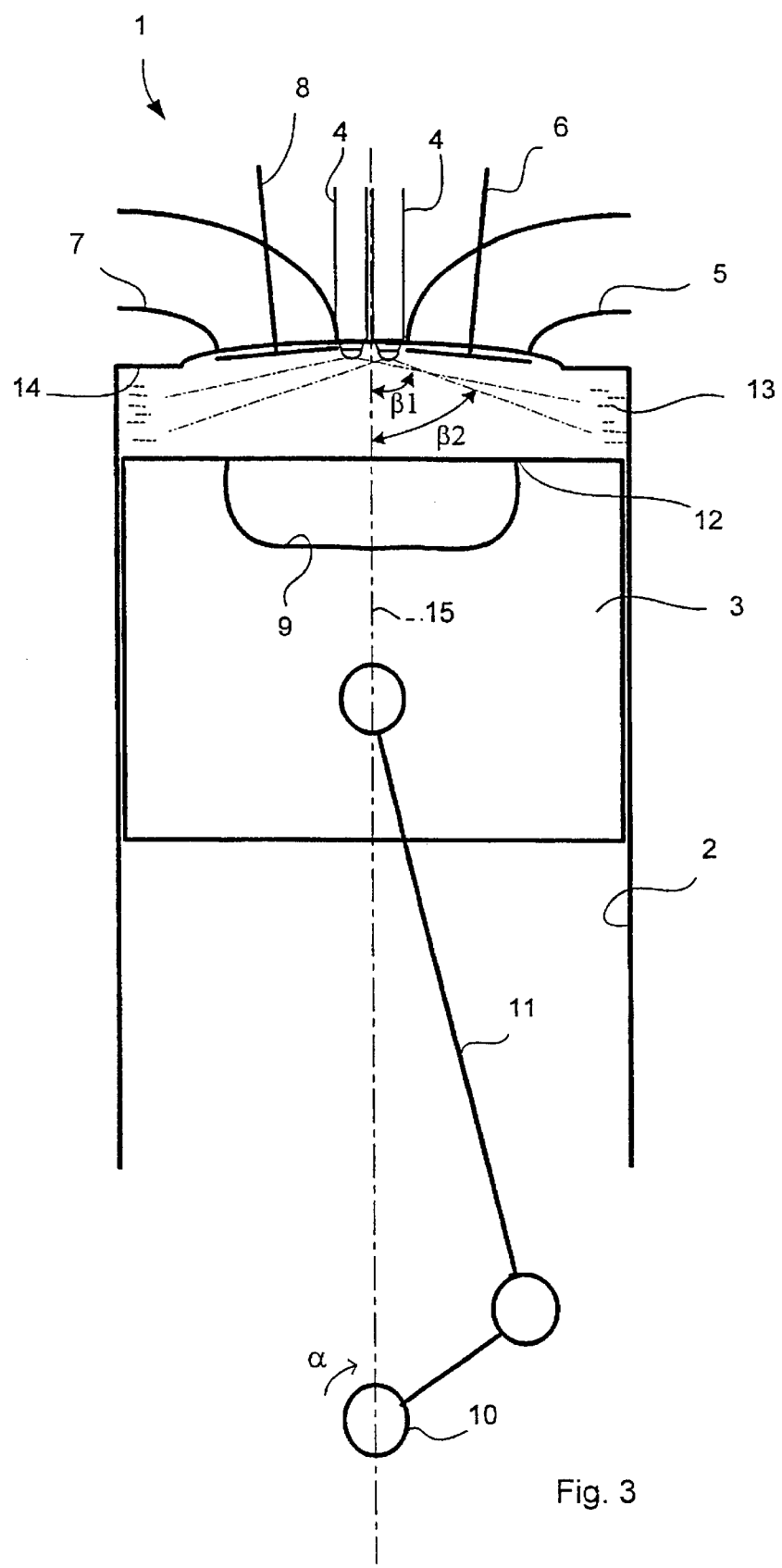
FIG. 3 shows a diagrammatic view of an internal combustion engine in which a primary injection and a post-injection of fuel are realized at different umbrella angles.

FIG. 3 shows an alternative configuration of the invention, in which two injection nozzles are disposed in the cylinder 2. This enables the fuel, during the primary injection and the post-injection, to be injectable at different umbrella angles β1 and β2. The umbrella angle β1 at which the fuel is injected during the primary injection is preferably chosen to resemble the previously described umbrella angle β. The umbrella angle β2 at which the fluid is injected during the post-injection is preferably chosen such that regions with rich fuel/gas mixture are reached and remixed by the fuel injected during the post-injection.

Figure 4:
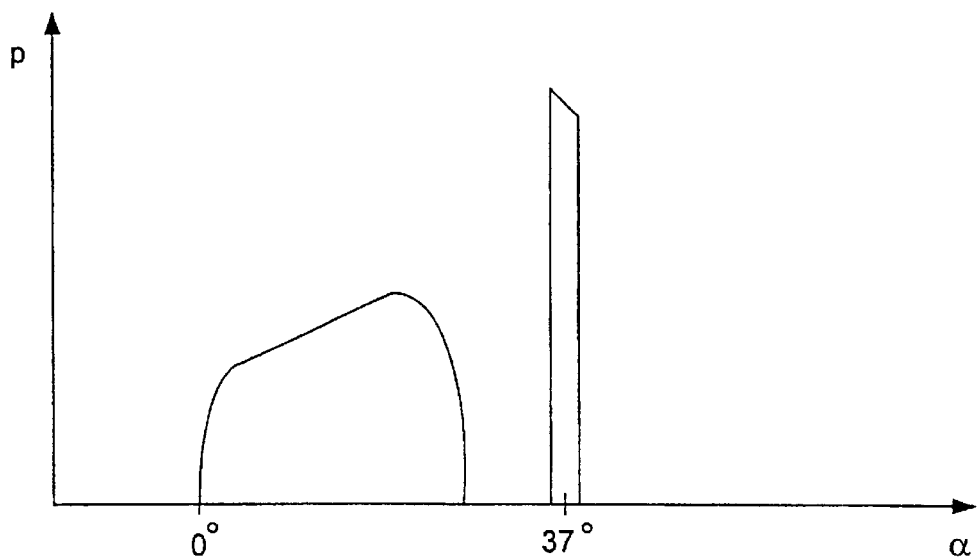
FIG. 4 shows the injection pressure as a function of the angle of rotation of a crankshaft belonging to the engine.

In FIG. 4, the injection pressure p is shown as a function of the angle of rotation α of the crankshaft 10. As can be seen from FIG. 3, during the primary injection fuel is injected in an amount corresponding to approximately 70–95%, preferably approximately 80%, of the total fluid injected into the cylinder 2. The fluid in the post-injection is injected with a duration corresponding to the angle of rotation α of approximately 2° of the crankshaft 10 of the engine 1. The injection pressure of the fluid in the post-injection is higher than the injection pressure of the fuel in the primary injection. The injection pressure of the fuel in the primary injection is 200–1500 bar, preferably 300–1000 bar, and the injection pressure of the fluid in the post-injection is 1500–3000 bar, preferably 1600–2000 bar. These pressures can, of course, vary during the course of the injection.

Figure 5:
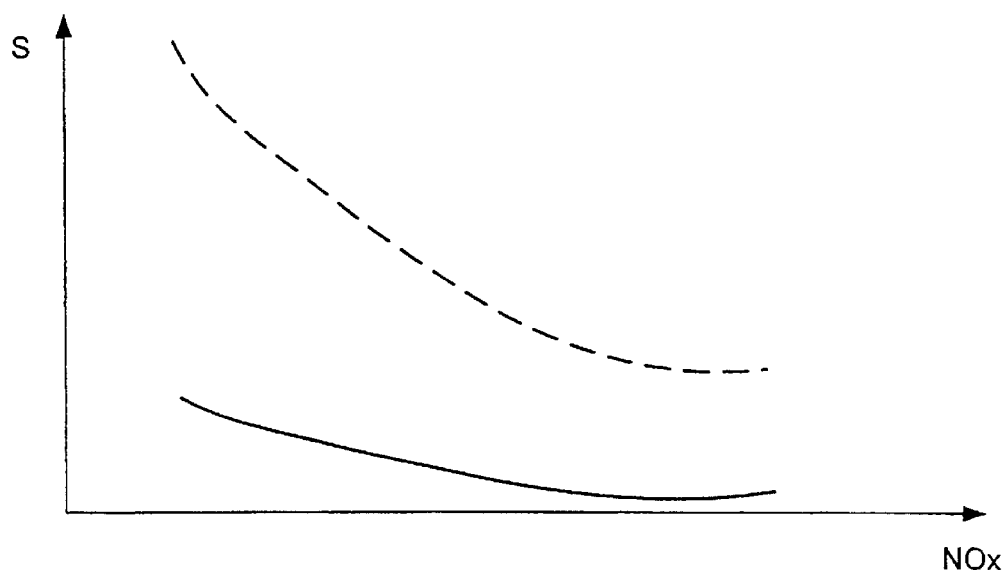
FIG. 5 shows the soot particle content as a function of the nitrous oxide content in the exhaust gases of the internal combustion engine.

In FIG. 5, the soot particle content is shown as a function of the nitrous oxide content in the exhaust gases of the internal combustion engine 1. The dashed curve relates to the soot particle content as a function of the nitrous oxide content of a known internal combustion engine and the continuous curve relates to the soot particle content as a function of the nitrous oxide content of an internal combustion engine in which the fuel injection is controlled with a method according to the present invention. It can be seen from FIG. 5 that the soot particle content, at a given nitrous oxide content in the waste gases of the engine 1, is substantially lower if the fuel injection is controlled by a method according to the present invention.

The method of controlling the fuel injection in an internal combustion engine 1 according to the present invention can be applied during all types of running of the engine 1. Preferably, the fuel injection is controlled such that the post-injection is only realized when an air deficit might be expected to arise, such as when the engine 1 is running at high altitude or when the engine is running at elevated ambient temperature when the air is thin, that is to say the air has low density, which means that the quantity of air sucked into the cylinder contains a smaller number of oxygen molecules per sucked-in unit of volume. This also occurs during transient processes, such as when the accelerator is pressed. If the engine is provided with an exhaust-driven turbo, the turbo will react slowly when the accelerator is pressed, which leads to a relatively small amount of air being introduced into the cylinder 2, resulting in the formation of regions with rich fuel/gas mixture in the cylinder 2, so that the soot formation increases. The post-injection which is realized according to the present method ensures in this case that a satisfactory oxidation of soot particles occurs. This will be explained in greater detail below.

By recycling exhaust gases to the cylinder 2, so-called EGR (Exhaust Gas Recirculation), the generation of nitrous oxides (NOx) is able to be reduced. This occurs, however, at the expense of increased soot particle generation. By combining exhaust gas recycling with the post-injection according to the present method, the soot particle content in the exhaust gases discharged from the engine is kept below statutory limit values.

It has been shown that post-injection, and, in particular, late post-injection, unless it is supplemented by other measures, leads to worsened fuel consumption. In order to minimize this effect, the post-injection should be realized in an optimal manner, should contain as little fluid as possible and should induce the fluid to burn as fast as possible. It has also been shown that the effect of the post-injection, inter alia, is controlled by the cylinder and piston geometry. The higher the injection pressure at the start of the post-injection, the less fuel is needed to produce the necessary agitation, and the higher the injection pressure at the start of the injection, the faster the injected fuel burns.

One way of increasing the efficiency of an engine without dramatically increasing the generation of nitrous oxides is to increase the quantity of recirculated exhaust gases, at the same time as the fuel injection time is brought forward. This method does, however, lead to high soot particle contents in the exhaust gases. In order to avoid these high soot particle contents, a post-injection of fuel is realized in order thereby to produce purer exhaust gases, but with only a negligible increase or no increase at all in fuel consumption. Large quantities of recirculated exhaust gases lead, however, to increased complexity in respect of the engine and combustion method. Moreover, refinement of the post-injection with a view to obtaining low fuel consumption can lead to a reduction in its anti-sooting effect. It can therefore be advantageous to utilize the post-infection only at running points in which fuel consumption is of minor importance.

High-altitude driving creates problems with smoke, owing to the thinner air. Since this is a rarely occurring running phenomenon, one can then take the liberty of combatting high soot particle content with a post-injection which has been refined so as best to combat the soot particles.

Transients, especially a rapid increase in revs, also produce problems of high soot particle contents in the exhaust gases. This arises from the fact that the turbo is momentarily incapable of raising the supercharging to the high-load level. This can take a comparatively long time before a satisfactory supercharge level has been reached for the new load. During that time, the engine operates with lower air excess than is desirable. To prevent the air excess from becoming much too low, the load derivatives of the control system of the engine are restricted, such that the turbo manages to achieve the desired r.p.m.

During an increase in revs, the post-injection offers a number of advantages. Since the post-injection helps to increase the oxidation of soot particles, a lower air excess can be offset. The control system of the engine is thus more quickly able to compensate the load to the required higher level. The result is an engine which responds faster when the accelerator is pressed. The lower efficiency with the post-injection in its basic version results in more energy being supplied to the turbo, which hence more quickly reaches the required r.p.m., in turn leading to a faster response from the engine when the accelerator is pressed.

In the above, only one post-injection has been described. It is possible, however, for a plurality of post-injections to be realized one after the other.

What is claimed is:

1. Method of controlling the fuel injection in an internal combustion engine (1) comprising a piston (3), which passes to and fro in a cylinder (2) between an upper and a lower dead centre, and an injection nozzle (4), which is disposed in the cylinder (2), the method comprising the steps whereby a primary injection of fuel is realized in the cylinder (2), which fuel is ignited and causes the piston (3) to be moved in the direction of the lower dead centre in the cylinder (2), and whereby a post-injection of a fluid is realized in the cylinder (2), characterized in that the injection pressure of the fluid in the post-injection is higher than the injection pressure of the fuel in the primary injection.

2. Method according to claim 1, characterized in that the injection pressure of the fluid in the post-injection is 1500–3000 bar, preferably 1600–2000 bar, and in that the injection pressure of the fuel in the primary injection is 200–1500 bar, preferably 300–1000 bar.

3. Method according to claim 1, characterized in that the post-injection is realized when the piston (3) has been moved in the direction of the lower dead centre in the cylinder (2), corresponding to the angle of rotation α of a crankshaft (10) belonging to the engine (1) within the range 20°–60°, preferably within the range 27°–50°, after the upper dead centre with respect to the working stroke of the engine.

4. Method according to claim 3, characterized in that the post-injection is realized when the angle of rotation (α) of the crankshaft (10) is approximately 40°, preferably approximately 37°, after the upper dead centre with respect to the working stroke of the engine.

5. Method according to claim 1, characterized in that the fluid, in the post-injection, is injected with a duration corresponding to the angle of rotation (α) of approximately 2° of a crankshaft (10) belonging to the engine (1).

6. Method according to claim 1, characterized in that during the primary injection fuel is injected in an amount corresponding to approximately 70–95%, preferably approximately 80%, of the total fluid injected into the cylinder (2).

7. Method according to claim 1, characterized in that the piston (3), on a top side, is provided with a recess (9) for the formation of a combustion chamber and in that the fluid is injected into the cylinder (2) at an umbrella angle (β) in relation to the centerline (15) of the cylinder (2) such that the fluid, during the post-injection, is prevented from hitting the recess (9) of the piston (3).

8. Method according to claim 1, characterized in that the fluid is injected into the cylinder (2) at an umbrella angle (β) in relation to the centerline (15) of the cylinder (2) such that the fluid, during the post-injection, is prevented from hitting the piston (3).

9. Method according to claim 1, characterized in that during the post-injection the fluid is injected into the cylinder (2) at an umbrella angle (β2) in relation to the centerline (15) of the cylinder (2), and in that during the primary injection the fuel is injected into the cylinder (2) at an umbrella angle (β1) in relation to the centerline (15) of the cylinder (2).

10. Method according to claim 1, characterized in that the fluid which is supplied during the post-injection is fuel, such as diesel oil.

11. Method according to claim 1, characterized in that the post-injection is only realized when the engine (1) is running at high altitude, when the air is thin, which means that the quantity of air sucked into the engine (1) contains a relatively small number of oxygen molecules per sucked-in unit of volume.

12. Method according to claim 1, characterized in that the post-injection is only realized when the engine (1) is running during transient processes.

* * * * *